United States Patent
Hayakawa et al.

(10) Patent No.: US 9,776,559 B2
(45) Date of Patent: Oct. 3, 2017

(54) VEHICULAR DISPLAY SYSTEM

(71) Applicant: KOITO MANUFACTURING CO., LTD., Tokyo (JP)

(72) Inventors: Michihiko Hayakawa, Shizuoka (JP); Takao Muramatsu, Shizuoka (JP); Naoki Sugiura, Shizuoka (JP); Syouhei Yanagidu, Shizuoka (JP); Satoshi Kikuchi, Shizuoka (JP); Hiroaki Hara, Shizuoka (JP); Takayoshi Ishizuka, Shizuoka (JP); Hidetada Tanaka, Shizuoka (JP); Takeshi Masuda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 24 days.

(21) Appl. No.: 15/091,838

(22) Filed: Apr. 6, 2016

(65) Prior Publication Data

US 2016/0297357 A1    Oct. 13, 2016

(30) Foreign Application Priority Data

Apr. 7, 2015    (JP) ................................. 2015-078428

(51) Int. Cl.
*B60Q 1/00*    (2006.01)
*B60Q 1/50*    (2006.01)
*F21S 8/10*    (2006.01)

(52) U.S. Cl.
CPC ............ *B60Q 1/50* (2013.01); *F21S 48/1145* (2013.01); *F21S 48/1388* (2013.01); *F21S 48/1757* (2013.01); *B60Q 2400/50* (2013.01)

(58) Field of Classification Search
CPC ... B60Q 1/50; B60Q 2400/50; F21S 48/1145; F21S 48/1388; F21S 48/1757
USPC ......... 340/425.5, 426, 539.1, 441, 435, 436, 340/465, 466, 475; 701/36
See application file for complete search history.

(56) References Cited

U.S. PATENT DOCUMENTS

| | | | |
|---|---|---|---|
| 2007/0008096 A1* | 1/2007 | Tracy ..................... | B60Q 1/442 340/476 |
| 2009/0187307 A1* | 7/2009 | Imaeda .................. | B60Q 1/525 701/36 |
| 2014/0203923 A1* | 7/2014 | Lai .......................... | B62J 6/001 340/432 |

FOREIGN PATENT DOCUMENTS

JP    2008-45870 A    2/2008

* cited by examiner

*Primary Examiner* — Daryl Pope
(74) *Attorney, Agent, or Firm* — Sughrue Mion, PLLC

(57) ABSTRACT

In one embodiment of the vehicular display system, the drawing unit operates when the vehicle speed is within a predetermined low speed area, starts an operation thereof when the vehicle speed becomes above a lower limit of the low speed area, and stops the operation thereof when the vehicle speed exceeds an upper limit of the low speed area.

6 Claims, 10 Drawing Sheets

VEHICULAR DISPLAY SYSTEM

CROSS-REFERENCE TO RELATED APPLICATION

This application claims priority from Japanese Patent Application No. 2015-078428 filed on Apr. 7, 2015, the entire contents of which are incorporated herein by reference.

FIELD

The present invention relates to a vehicular display system configured to display an attention call during traveling.

BACKGROUND

In recent years, a vehicular display system configured to display an attention call for a driver or other person such as a pedestrian and a person in an opposite vehicle by drawing figures, letters and the like on a road surface and the like has been known. For example, JP 2008045870A discloses a configuration of driving a laser head mounted at a front part of a vehicle to draw a figure such as 'No Trespassing' on a road surface.

However, it is difficult to present the display so that it is not deformed, as seen from a line of sight of the driver or other person. The problem becomes more conspicuous when the vehicle travels at high speed. Having extensively studied the problem, the inventors found a vehicle speed or a display aspect which enables the display to be effectively recognized

SUMMARY

It is therefore an object of the present invention to provide a vehicular display system capable of effectively displaying an attention call during traveling.

In order to achieve the above object, according to an aspect of the present invention, there is provided a vehicular display system including a vehicle speed sensor detecting a vehicle speed of a vehicle, an information sensor detecting information to which a driver and/or other person should pay attention, and a drawing unit drawing a predetermined display around the vehicle in conjunction with a detection of the information sensor.

The drawing unit operates when the vehicle speed is within a predetermined low speed area, starts an operation thereof when the vehicle speed becomes above a lower limit of the low speed area, and stops the operation thereof when the vehicle speed exceeds an upper limit of the low speed area.

According to the above aspect, the display of the attention call is made only when the vehicle speed is within the low speed area. Therefore, the display is more difficult to spread than during high-speed traveling and can be visibly recognized as a display having less distortion by the driver and/or other person, so that it is possible to effectively display the attention call.

After the drawing unit stops the operation thereof as the vehicle speed exceeds the upper limit, the drawing unit may again operate when the vehicle speed becomes a predetermined buffer value or less within the low speed area.

When the display is turned on/off with the upper limit being set as a threshold value, a flicker of the display occurs at a situation where the vehicle speed increases and decreases around the upper limit, so that the driver may feel confused. However, according to this aspect, a redisplay that is to be made after the operation stops as the vehicle speed exceeds the upper limit is made with an appropriate time interval. Therefore, it is possible to effectively call the driver's attention.

The upper limit may be set to a vehicle speed of 35 km/h or higher. When the vehicle speed exceeds 35 km/h, the display tends to spread.

The spread of the display is little when the vehicle speed is equal to or less than 35 km/h. Therefore, it is possible to effectively display the attention call.

The lower limit may be equal to or less than a vehicle speed of 20 km/h.

The operation is stopped at a situation where the necessity of the attention call is not high. Thereby, the confusion to be caused to the driver is reduced, and it is possible to effectively display the attention call.

The buffer value may be 85% or higher of the upper limit. For example, when the upper limit is the vehicle speed of 35 km/h, the redisplay that is to be made after the operation stops is set to be performed at the vehicle speed of 30 km/h. Thereby, it is possible to effectively accomplish both the blinking prevention and the attention call.

The drawing unit may be configured to increase an output of a light source forming the display in proportion to an increase in the vehicle speed. As the vehicle speed increases, an eye point of the driver faces a farther side and a spread of the display occurs. Therefore, it is possible to make a clear display by increasing the output of the light source, thereby effectively displaying the attention call.

According to the disclosure, it is possible to provide the vehicular display system capable of effectively displaying the attention call during the traveling.

DETAILED DESCRIPTION

Figure 1:
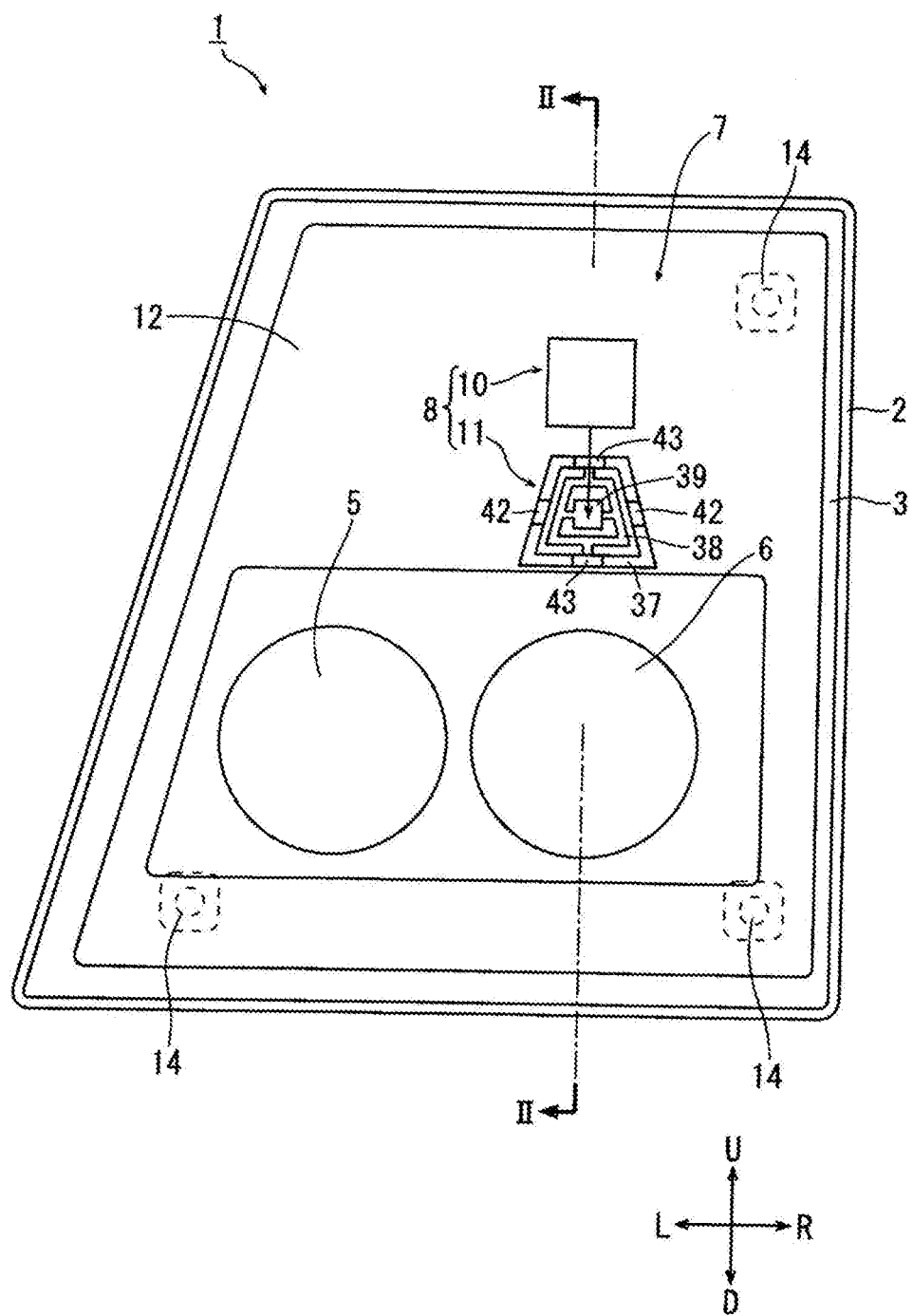
FIG. 1 is a front view of a vehicular lamp device including a vehicular display system according to an illustrative embodiment.

Hereinafter, an appropriate illustrative embodiment of the present invention will be described with reference to the drawings. FIG. 1 is a front view of a vehicular lamp device including a vehicular display system according to an illustrative embodiment of the present invention, and FIG. 2 is a longitudinally sectional view of the lamp device shown in FIG. 1 (a sectional view taken along a line II-II of FIG. 1).

(Overall Configuration)

Figure 2:
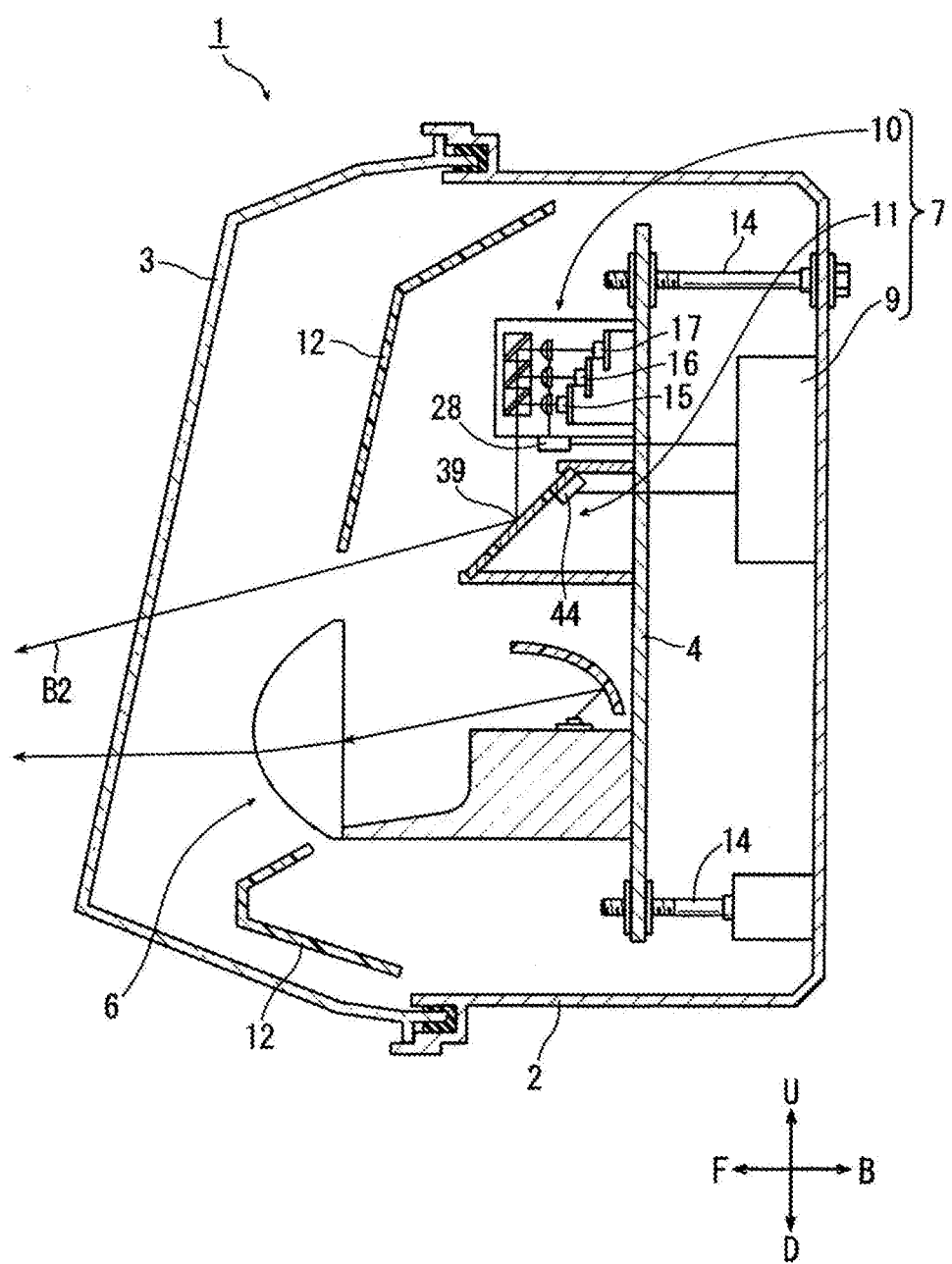
FIG. 2 is a longitudinally sectional view of the lamp device shown in FIG. 1.

FIGS. 1 and 2 depict a vehicular lamp device 1 including a vehicular display system 7. The lamp device 1 is a headlamp provided at a left or right side of a front part of a vehicle. An arrow L-R indicates a left-right direction, an arrow U-D indicates an upper-lower direction and an arrow F-B indicates a front-rear direction, when seeing the lamp device 1 from the front. In the meantime, a configuration where the vehicular display system 7 is provided for any one of the left and right lamp devices 1 is described. However, the vehicular display system 7 may also be provided for both the left and right lamp devices 1.

The lamp device 1 is configured to define a lamp compartment by a box-shaped lamp body 2 having an opening, and a front cover 3 attached to the opening of the lamp body 2 and made of translucent resin or glass. A light source unit for high beam 5, a light source unit for low beam 6, the vehicular display system 7, a vertical bracket 4 and an extension 12 are disposed in the lamp compartment.

The light source unit for high beam 5 and the light source unit for low beam 6 are configured to form a light distribution pattern for high beam and a light distribution pattern for low beam. As the light source units 5, 6, a reflection-type or projector-type lamp device unit may be used. Herein, the type is not particularly limited. The light source unit for low beam 6 shown in FIG. 2 is a projector-type. The light source unit for high beam 5 and the light source unit for low beam 6 are fixed to a front surface of the metallic vertical bracket 4 serving as a support member of the light sources. The vertical bracket 4 is fixed to the lamp body 2 at three corners thereof by aiming screws 14, and is configured to adjust each optical axis from side to side and up and down. At the front of the light source units 5, 6 and (a drawing unit 8 of) the vehicular display system 7 (which will be described later) in the lamp compartment, the extension 12 serving as a blinder member and having an opening enabling respective emission lights to advance towards the front of the lamp device is provided.

(Vehicular Display System)

The vehicular display system 7 has a drawing unit 8 configured to draw a predetermined display and a control device 9 including a vehicle speed sensor and an information sensor.

(Drawing Unit)

The drawing unit 8 has a laser light source unit 10 and a scanning mechanism 11.

As shown in FIG. 2, the laser light source unit 10 is an RGB laser unit. The laser light source unit 10 includes a first light source 15 configured to emit a red laser light, a second light source 16 configured to emit a green laser light, and a third light source 17 configured to emit a blue laser light. These light sources 15, 16, 17 are respectively fixed to a support base via a substrate. The laser light source unit 10 is configured to condense the respective emission lights from the light sources 15, 16, 17 into parallel lights by condensing lenses disposed at the front of the light sources, to enable the parallel lights to be incident to dichroic mirrors disposed at the front of the condensing lenses for RGB synthesis, and to form a laser light B2 of a single color, a mixed color or white by controlling ON/OFF operations of the light sources 15, 16, 17. The laser light source unit 10 has a monitor 28 configured to control outputs of the light sources 15, 16, 17, and to monitor an irradiation intensity of the laser light B2.

In the meantime, the light sources of the laser light source unit 10 are not limited to the configuration where the three RGB light sources are provided by the light sources 15, 16, 17, and may include a light source where a white light is to be generated by excitation with a configuration where a white light source of a single body is provided, a configuration where four light sources including RGB and an orange laser diode are provided or a configuration where an emission light of a blue laser diode is enabled to pass through a yellow fluorescent body. Also, each of the light sources 15, 16, 17 may be a laser light source other than the laser diode.

As shown in FIG. 1, the scanning mechanism 11 is a MEMS (Micro Electro Mechanical Systems) mirror. The scanning mechanism 11 has a base part 37, a first rotary body 38, a second rotary body (reflection part) 39, magnets 42, 43 provided around the base part 37 and a terminal part 44. The first rotary body 38 is supported to the base part 37 by a pair of torsion bars provided at a central opening of the base part 37 so that it is rotatable in a left-right direction (horizontal direction). The second rotary body 39 is supported to the first rotary body 38 by a pair of torsion bars provided at a central opening of the first rotary body 38 so that it is rotatable in an upper-lower direction (vertical direction). The second rotary body 39 is formed on its front surface with a reflection part by vapor deposition processing, plating processing or the like. A first coil (not shown) connected to the control device 9 is wired to the first rotary body 38, and a second coil (not shown) connected to the control device 9 is wired to the second rotary body 39. The base part 37 is provided at its left and right sides with a pair of permanent magnets 42 and at its upper and lower sides with a pair of permanent magnets 43. The first coil and the second coil are connected to the control device 9 via the terminal part 44. The first coil, the permanent magnet 42, the second coil and the permanent magnet 43 configure an actuator for scanning 58 of FIG. 3, which will be described later. The actuator for scanning 58 is configured to rotate the first rotary body 38 and the second rotary body 39 by individually changing magnitudes and directions of driving currents flowing through the first coil and the second coil, thereby changing a direction of the second rotary body (reflection part) 39. In the meantime, as the scanning mechanism 11, other scan optical system such as a Galvano mirror, a DMD (Digital Micro Mirror Device) or the like may also be adopted.

As shown in FIG. 2, the laser light source unit 10 is fixed to the front surface of the vertical bracket 4 with an optical axis thereof facing downwards. The scanning mechanism 11 is fixed with being inclined from a front-lower side of the lamp device towards a rear-upper side of the lamp device by a horizontally-holding plate fixed to the vertical bracket 4 so that the reflection part 39 is arranged on the optical axis of the laser light source unit 10 and the emission light is reflected towards the front of the lamp device.

The drawing unit 8 is configured to reflect the laser light B2 emitted from the laser light source unit 10 on the scanning mechanism 11 and to scan the same into a preset rectangular scanning area. The scanning area is preferably set to cover at least a road edge of a traveling traffic lane, an adjacent traffic lane, and a range of 5 to 50 meters ahead of the vehicle. An upper-lower end of the scanning area is preferably set within a range of −1 degree to −8 degrees of an H-H line and a left-right end of the scanning area is preferably set within a range of 20 degrees to −20 degrees of a V-V line on a virtual vertical screen virtually provided at a position 25 meters ahead of the lamp device 1.

(Control Device)

Figure 3:
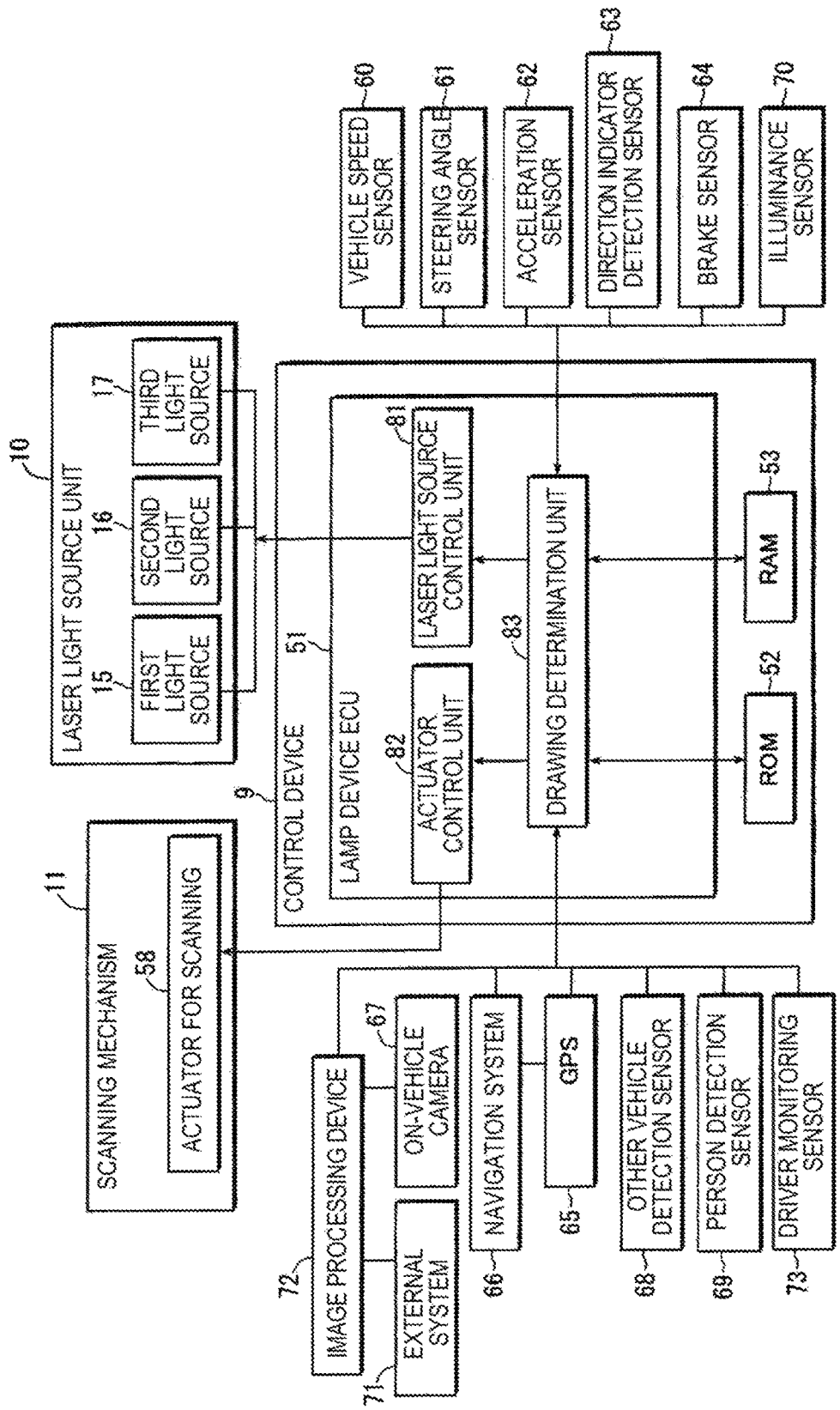
FIG. 3 is a functional block diagram describing a control device.

FIG. 3 is a functional block diagram describing the control device 9. The control device 9 has a lamp device ECU 51, a ROM 52, a RAM 53 and the like. In the ROM 52, a variety of control programs are recorded. The lamp device ECU 51 is configured to execute the control programs recorded in the ROM 52 on the RAM 53, and to generate diverse control signals. In the meantime, the control device 9 may be hardware-implemented by a semiconductor device or an electric circuit or may be software-implemented by a computer program. However, one skilled in the art can easily conceive the control device in other forms by a variety of combinations thereof. The control device 9 is fixed to the lamp body 2, for example.

The lamp device ECU 51 is connected to the vehicle speed sensor 60. In addition, the lamp device ECU 51 is connected to information sensors, for example, a steering angle sensor 61, an acceleration sensor 62, a direction indicator detection sensor 63, a brake sensor 64, a navigation system 66, an on-vehicle camera 67, other vehicle detection sensor 68, a person detection sensor 69, an illuminance sensor 70, and a driver monitoring sensor 73. The information sensors are not limited to the examples, and may include the others for detecting information that the driver and/or other person should pay attention during the traveling of the vehicle.

The vehicle speed sensor 60 may be a sensor usually provided for the vehicle, such as a mechanical sensor or an electric sensor, and is configured to detect a vehicle speed by detecting rotations of wheels. The steering angle sensor 61 is configured to detect a turning angle of a steering wheel. The acceleration sensor 62 is configured to detect an accelerator depression amount. The direction indicator detection sensor 63 is configured to detect a switch operation of a direction indicator. The brake sensor 64 is configured to detect a brake depression amount. The navigation system 66 is configured to detect a current position of the vehicle on the basis of data received from a GPS 65 and map data and to guide a route to a destination. The on-vehicle camera 67 is provided at a front part, a rear part or necessary direction of the vehicle and is configured to capture/record an image in the corresponding direction. The image data captured by the on-vehicle camera 67 is image-processed by an image processing device 72, so that a target object is recognized The image processing device 72 performs the image processing when image data is received from not only the on-vehicle camera 67 but also a camera other than the on-vehicle camera 67, for example, an external system 71 such as an intersection camera provided at an intersection or a monitoring camera, too. The other vehicle detection sensor 68 is configured to detect a distance or a relative speed to other vehicle in the front-rear direction of the vehicle or at a side of the vehicle by a millimeter-wave radar or the like. The person detection sensor 69 is configured to detect a person in the front-rear direction or at a side by an infrared or the like. The illuminance sensor 70 is configured to detect brightness of a surrounding environment of the vehicle by using a photoelectric effect. The driver monitoring sensor 73 is configured to detect a driver status by an image analysis on eyeballs by an eye camera arranged in the vehicle or a heartbeat analysis device arranged in the steering wheel.

The lamp device ECU 51 has a laser light source control unit 81, an actuator control unit 82 and a drawing determination unit 83.

The laser light source control unit 81 is configured to independently control ON/OFF operations of the light sources 15, 16, 17, and to control on/off, an emission color, and an emission intensity of the laser light B2 based on contents determined by the drawing determination unit 83 which will be described later.

The actuator control unit 82 is configured to output an actuator control signal on the basis of contents determined by the drawing determination unit 83, thereby driving the actuator for scanning 58 and controlling the rotation of the reflection part 39.

The actuator control unit 82 is configured to repeatedly perform the scanning in the above-described scanning area in the horizontal direction while deviating the position downwards by a slight distance. The laser light source control unit 81 is configured to turn on some or all of the first to third light sources 15 to 17 for emitting the laser light B2 while the scanning mechanism 11 performs the scanning for drawing a display, and to turn off all of the first to third light sources 15 to 17 for a time period during which the scanning for drawing a display is not performed. Thereby, the vehicular display system 7 can draw a display of any shape by repeating one cycle (one scan) of the scanning at high speed in the scanning area to accumulate luminous points. In the meantime, the scanning mechanism 11 may also be configured to perform a scanning other than the horizontal scanning.

Herein, the inventors, after having extensively studied, found that the vehicle speed is also important so as to enable the driver or other person to effectively recognize the display, although a drawing size, brightness (contrast) and a display method may be exemplified as important factors regarding the specification of the road surface drawing. The inventors performed a sensory evaluation on a display aspect, which is to be seen by a test subject at a pedestrian position and a driver seat, by stepwise changing the vehicle speed with a light source having a light flux of 3000 ANSI lumen. The inventors confirmed that when the vehicle speed exceeds 35 km/h, the display tends to spread at an eye point of the driver and thus the evaluation has a low rating. Therefore, the inventors determined that it is effective to set an upper limit VpU with respect to the vehicle speed so that the display is not deformed, as seen from a line of sight of the driver or other person. Also, the inventors confirmed that the display instead causes the confusion to a driver who drives the vehicle while normally paying attention, in many cases. Therefore, the inventors determined that it is effective to set a lower limit VpL with respect to the vehicle speed and not to make a display at a vehicle speed at which the necessity of the attention call is not high.

Further, the inventors confirmed that when the display is turned on/off with the upper limit VpU being set as a threshold value, a flicker of the display occurs at a situation where the vehicle speed increases and decreases around the upper limit VpU, so that the driver feels confused in many cases. Therefore, the inventors determined that it is effective to set a predetermined buffer value VpB in the low speed area so that a redisplay to be made after the display stops as the vehicle speed exceeds the upper limit VpU is made with an appropriate time interval.

By referring to the results of the sensory evaluation, the inventors determined that it is preferably to set the upper limit VpU of the low speed area to 35 km/h, the lower limit VpL to 20 km/h, and the buffer value VpB to about 85% of the upper limit VpU, i.e., the buffer value VpB of 30 km/h when the upper limit VpU is 35 km/h.

Based on the above, first, the drawing determination unit 83 is configured to acquire the vehicle speed from the vehicle speed sensor 60, and starts to operate the drawing unit 8 when the vehicle speed is equal to or higher than the lower limit VpL (20 km/h) of the low speed area and stops the operation of the drawing unit 8 when the vehicle speed exceeds the upper limit VpU (35 km/h). Secondly, the drawing determination unit 83 is configured to acquire the approaching of other person such as a pedestrian, an opposite vehicle and an obstacle and a driver status from the information sensors and to determine whether it is necessary to call a driver's and/or other person's attention, and operates the drawing unit 8 to draw a predetermined display around the vehicle when it is determined necessary. Thirdly, after the vehicle speed exceeds the upper limit VpU and the operation stops, the drawing determination unit 83 determines whether the vehicle speed is equal to or less than the buffer value VpB (30 km/h) and again operates the drawing unit 8 when the vehicle speed is equal to or less than the buffer value VpB.

Figure 4:
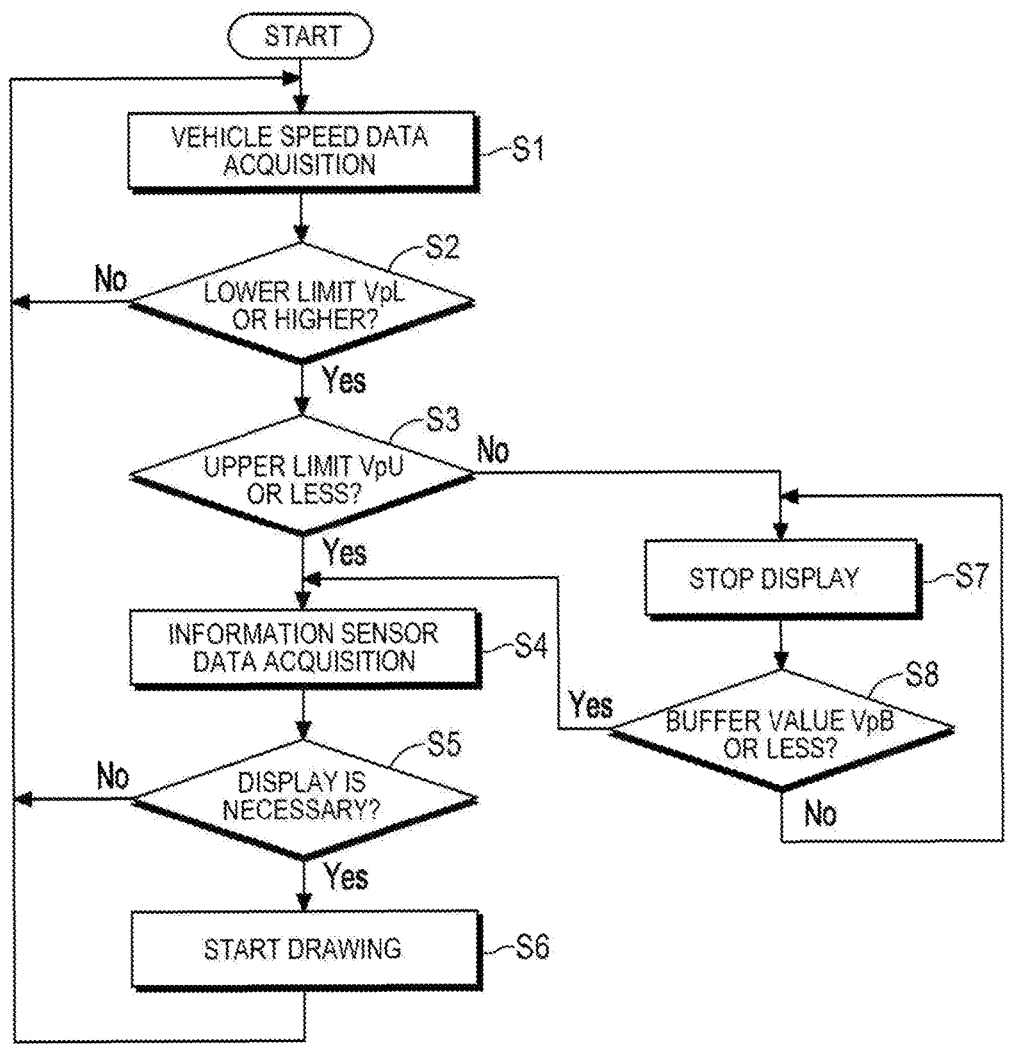
FIG. 4 is a flowchart describing drawing control.

Specifically, the drawing determination unit 83 is configured to make a display on the basis of a flow chart of FIG. 4, for example. First, in step S1, the drawing determination unit 83 acquires a signal from the vehicle speed sensor 60. Then, in step S2, the drawing determination unit 83 determines whether the vehicle speed is equal to or higher than the lower limit VpL. When the vehicle speed is equal to or higher than the lower limit VpL (YES), the drawing determination unit 83 proceeds to step S3. When the vehicle speed is less than the lower limit VpL (NO), the drawing determination unit 83 returns to step S1. Then, in step S3, the drawing determination unit 83 determines whether the vehicle speed is equal to or less than the upper limit VpU. When the vehicle speed is equal to or less than the upper limit VpU (YES), the drawing determination unit 83 proceeds to step S4. In step S4, the drawing determination unit 83 acquires the data from the above-described information sensors. Then, in step S5, the drawing determination unit 83 determines whether there is a situation that the driver and/or other person should pay attention. When it is determined that there is a situation to be paid attention and a display is necessary (YES), the drawing determination unit 83 proceeds to step S6 to start the drawing and then returns to step S1. On the other hand, when it is determined that there is no situation to be paid attention and a display is not necessary (NO), the drawing determination unit 83 returns to step S1. A specific example of the display that is to be made in step S5 will be described in below embodiments. On the other hand, when it is determined in step S3 that the vehicle speed exceeds the upper limit VpU (NO), the drawing determination unit 83 proceeds to step S7, and does not make a display or stops the display. Then, in step S8, the drawing determination unit 83 determines whether the vehicle speed is equal to or less than the buffer value VpB. When it is determined that the vehicle speed is equal to or less than the buffer value VpB (YES), the drawing determination unit 83 returns to step S4 and again determines whether the display is necessary. When it is determined that the vehicle speed exceeds the buffer value VpB (NO), the drawing determination unit 83 returns to step S7 and continues to stop the display.

The proper examples of the display that is to be made by the vehicular display system 7 configured as described above are described with reference to embodiments shown in FIGS. 5 to 12. In the drawings, a vehicle shown with the oblique lines is a vehicle (own vehicle) having the vehicular display system 7 mounted thereto and a vehicle having no oblique line indicates the other vehicle.

Embodiment 1

Figure 5A:
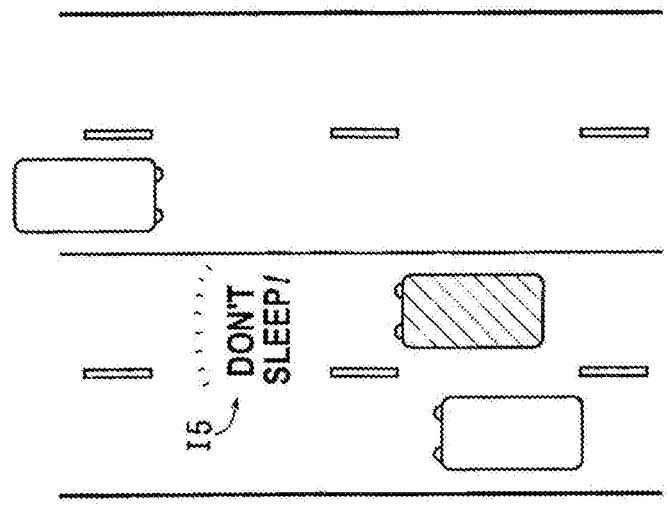
FIGS. 5A and 5B describe an embodiment of the vehicular display system.
Figure 5B:
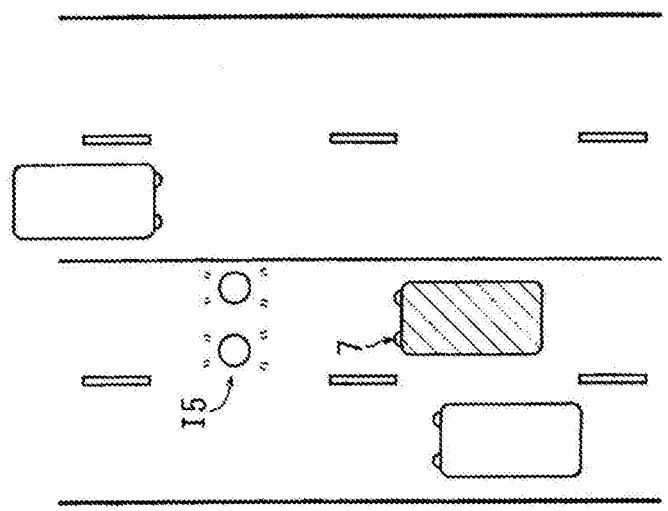

FIGS. 5A and 5B depict an example where it is determined in step S5 of FIG. 4 that a display is necessary because the driver monitoring sensor 73 detects the driver's drowsiness from movement of the eyeballs or the heart rate during the traveling in the low speed area. As shown in FIG. 5A, the vehicular display system 7 makes a display I5 for attention call on the road surface in front of the vehicle to call the driver's attention and to notify the other vehicles traveling around the vehicle for urging a driver to keep an inter-vehicular distance. In this case, the display I5 is preferably blinked (for example, a frequency of 2 Hz), instead of the always-on-light, because the pedestrian and the like can easily recognize the same with the low drawing light intensity.

Alternatively, as shown in FIG. 5B, a display having a higher message property such as 'Don't sleep' is also preferable because the other person can easily understand. Since the vehicular display system 7 is configured to make the display in the predetermined low speed area, even the display of a complex shape such as letters can be favorably recognized. Also, it is effective to urge the driver to watch the road surface by the blinking display or the message display when the driver monitoring sensor 73 detects a side glance of the driver from the movement of the eyeballs, for example.

Embodiment 2

Figure 6:
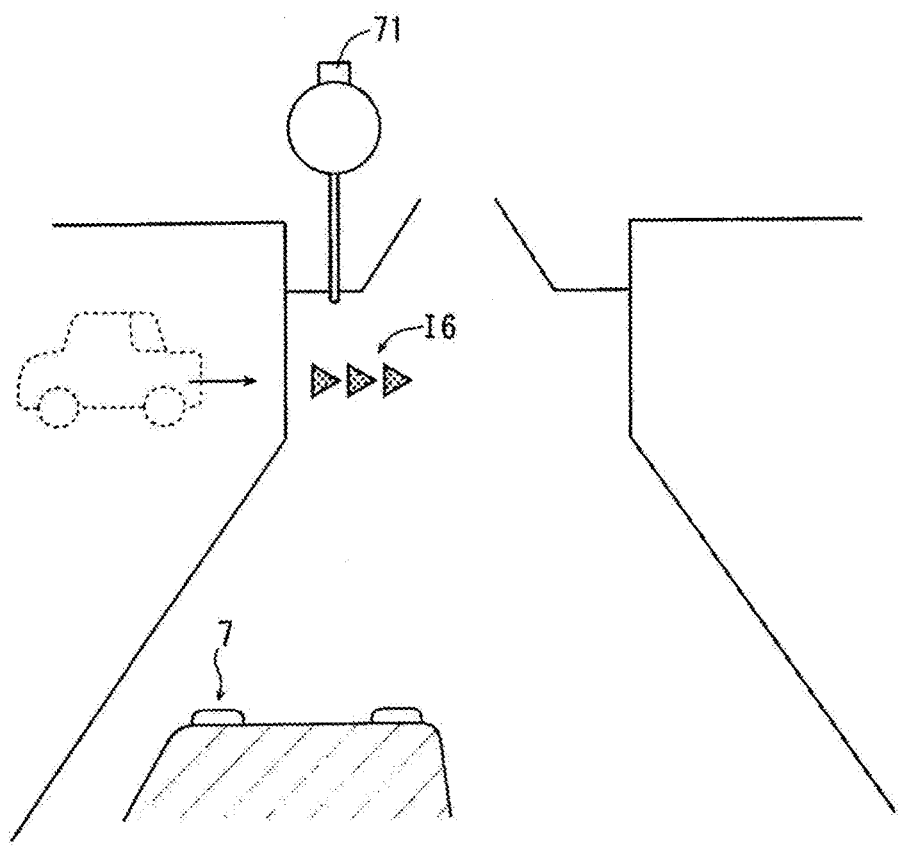
FIG. 6 describes an embodiment of the vehicular display system.

FIG. 6 depicts an example where it is determined in step S5 of FIG. 4 that a display is necessary because the other vehicle approaching an intersection is detected by the image data of the intersection camera (external system) 71 during the traveling in the low speed area. The vehicular display system 7 makes a blinking display I6, which is indicative of a traveling direction of the other vehicle, on the traveling traffic lane of the own vehicle, thereby calling the driver's attention. This example is effective for the intersection at which the visibility is poor.

Embodiment 3

Figure 7:
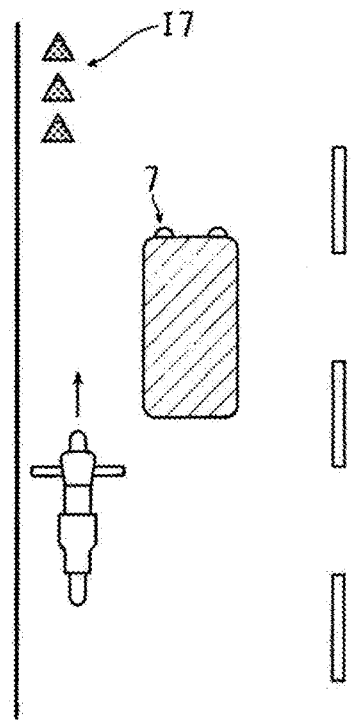
FIG. 7 describes an embodiment of the vehicular display system.

FIG. 7 depicts an example where it is determined in step S5 of FIG. 4 that a display is necessary because the other vehicle coming from a blind spot is detected by the other vehicle detection sensor 68 during the traveling in the low speed area. The vehicular display system 7 makes a blinking display I7, which indicates a traveling direction of the other vehicle, in front of the other vehicle on the traveling traffic lane of the own vehicle, thereby calling the driver's attention.

Embodiment 4

Figure 8:
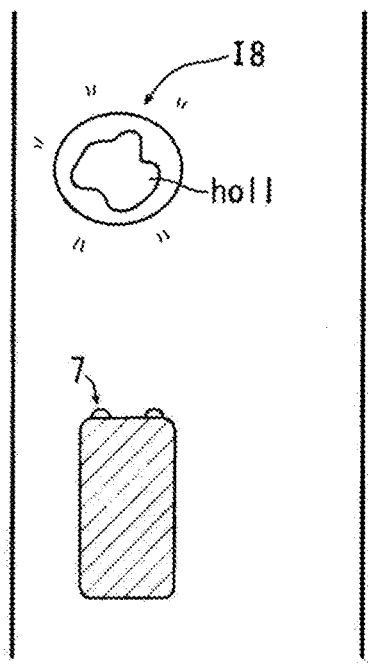
FIG. 8 describes an embodiment of the vehicular display system.

FIG. 8 depicts an example where it is determined in step S5 of FIG. 4 that a display is necessary because an obstacle such as a hole on the road surface is detected as an analysis result on the image data of the on-vehicle camera 67 by the image processing device 72 during the traveling in the low speed area. The vehicular display system 7 makes a blinking display I8 at a position of the obstacle, thereby calling the driver's attention.

Embodiment 5

Figure 9A:
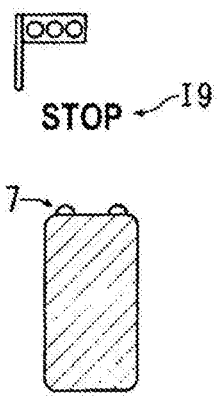
FIGS. 9A to 9C describe an embodiment of the vehicular display system.
Figure 9B:
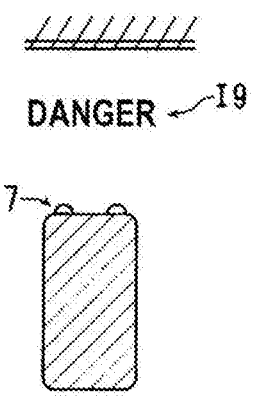
Figure 9C:
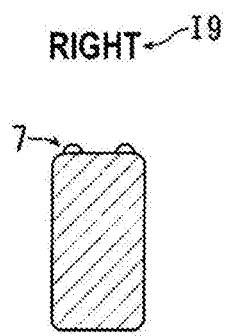

FIGS. 9A and 9B depict examples where it is determined in step S5 of FIG. 4 that a display is necessary because a stop situation is detected on the basis of the information of the on-vehicle camera 67 or the navigation system 66 during the traveling in the low speed area. The vehicular display system 7 makes a blinking display I9 of one word on the road surface in front of the vehicle for attention call, thereby calling the driver's attention. FIG. 9C depicts an example where a blinking display I9 of one word indicative of a direction of right or left turn is made on the basis of the information of the direction indicator detection sensor 63 or the navigation system 66 in step S5 of FIG. 4, thereby calling the driver's or other person's attention. Since the vehicular display system 7 is configured to make the display in the predetermined low speed area, even the display of a complex shape can be favorably recognized Embodiment 6

Figure 10:
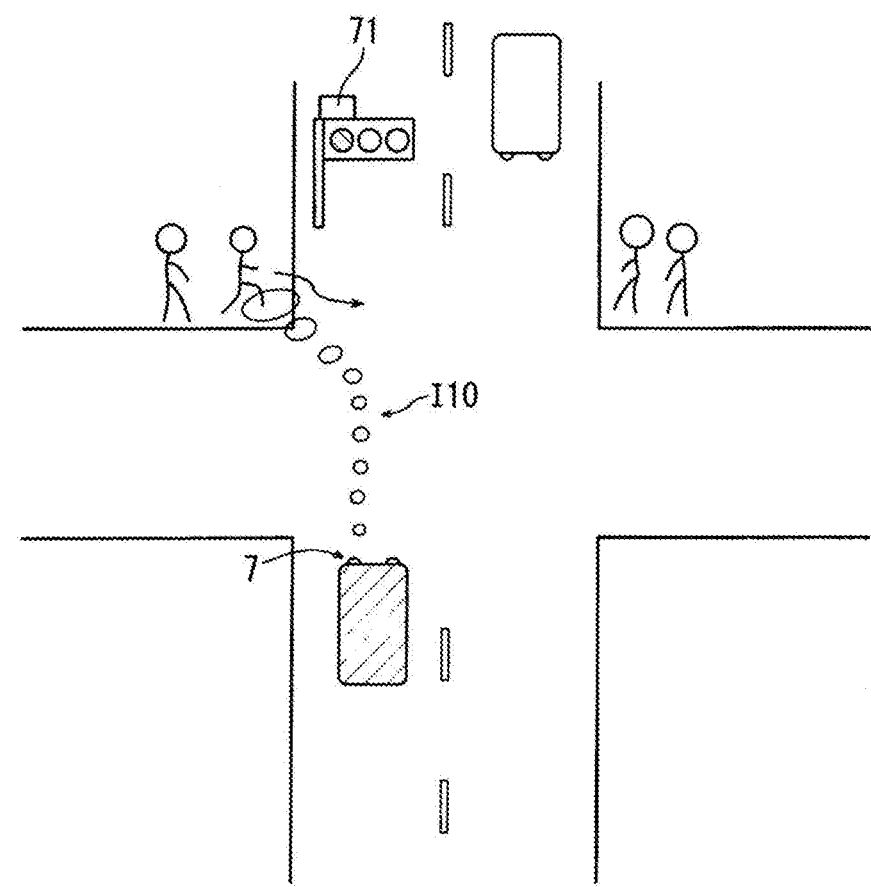
FIG. 10 describes an embodiment of the vehicular display system.

FIG. 10 depicts an example where it is determined in step S5 of FIG. 4 that a display is necessary because a person of the pedestrians who makes a dangerous movement such as jumping out into the road is detected as an observation result on the pedestrians in the vicinity of the intersection on the basis of the image processing data of the person detection sensor 69 or the intersection camera (external system) 71 during the traveling in the low speed area. The vehicular display system 7 makes a display I10, which displays the dangerous pedestrian by a guidance of light, on the road surface in front of the vehicle on the basis of the position information of the corresponding pedestrian, thereby calling the driver's and other person's attentions.

Embodiment 7

Figure 11:
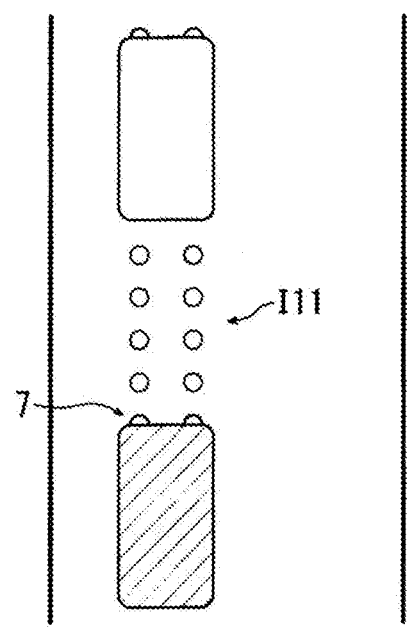
FIG. 11 describes an embodiment of the vehicular display system.

FIG. 11 depicts an example where it is determined in step S5 of FIG. 4 that a display is necessary when an inter-vehicular distance between the own vehicle and a leading vehicle detected by the other vehicle detection sensor 68 is shortened during the traveling in the low speed area. The vehicular display system 7 makes a display I11 between the vehicles, thereby calling the driver's attention. In this case, when the inter-vehicular distance is shortened, it is effective to change the display I11 from the always-on-light to the blinking, and as the inter-vehicular distance is shortened, it is effective to shorten the blinking frequency (for example, from 2 Hz to 4 Hz). Also, it is effective to arrange the other vehicle detection sensor 68 at the rear part of the vehicle, too, to make the display I11 in a situation where a rear-end collision is likely to occur and to change the blinking frequency or the display color, thereby calling the driver's attention.

Embodiment 8

Figure 12:
FIG. 12 describes an embodiment of the vehicular display system.
Figure 12:
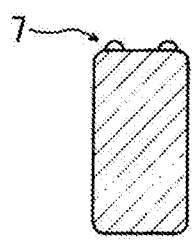

FIG. 12 depicts an example where it is determined in step S5 of FIG. 4 that a display is necessary because it is detected during the traveling in the low speed area that the own vehicle travels on a road on which a rate of accident occurrence is high, such as a community road, a school road or the like. The vehicular display system 7 makes a display I12 such as an exclamation mark for attention call on the road surface in front of the vehicle, thereby calling the driver's attention. Since the vehicular display system 7 makes the display in the predetermined low speed area, even the display of a complex shape can be favorably recognized.

According to the vehicular display system 7, the display for attention call is made only when the vehicle speed is within the low speed area (the lower limit VpL to the upper limit VpU), the display is more difficult to spread than during high-speed traveling and can be visibly recognized as a display having less distortion by the driver and/or other person. Also in any embodiment, at the situation where the vehicle speed increases and decreases around the upper limit VpU, the redisplay is not made until the vehicle speed becomes equal to or less than the buffer value VpB. Therefore, the driver's driving is less disturbed by the flicker of the display.

The above embodiments are only the examples of the display that is to be made by the vehicular display system 7, and a variety of changes can be made on the basis of the knowledge of one skilled in the art. As the respective displays I5 to I12, other letters, figures, shape changes or additional information capable of further improving the attention call may also be adopted depending on the situations. For example, it can be said that modified embodiments to be described below and combinations thereof are also within the scope of the disclosure.

By the above test, it was confirmed that the display tends to spread and thus is not seen well as the vehicle speed increases. Therefore, the drawing determination unit 83 may be configured to increase the output of the light source which forms the display, in proportion to the increase in the vehicle speed. The drawing determination unit 83 is configured to control the laser light source control unit 81 while detecting the value of the monitor 28 which controls the outputs of the light sources 15, 16, 17, thereby proportionally increasing the luminous intensity from 6200 cd to 60000 cd as the vehicle speed increases from the lower limit VpL to the upper limit VpU, for example. Thereby, it is possible to reduce the apparent spreading of the display. Also, during the control of the light intensity, the adjustment considering the traveling environments may be performed by detecting the surrounding brightness of the vehicle with the illuminance sensor 70.

The drawing determination unit 83 may turn on the display I5 to I12 all the time or blink the same when the vehicle speed becomes the lower limit VpL. Also, the drawing determination unit 83 may perform the control such as the starting/acceleration of the blinking when the driver accelerates the vehicle, the starting/acceleration of the blinking when the driver rapidly decelerates the vehicle, the starting/acceleration of the blinking when the pedestrian jumps out, the starting/acceleration of the blinking in accordance with a distance to an intersection, and the like, depending on the situations. Alternatively, the drawing determination unit 83 may be configured to change a color of a drawing from white to a chromatic color such as green, blue or the like, or to draw a dark spot area around the display I5 to I12 and to draw the display I5 to I12 in the dark spot area.

The drawing determination unit 83 may be configured to additionally display the detailed information about the driver such as a brake operation (usually, a rapid brake operation), an acceleration operation (a rapid acceleration operation), a steering wheel operation and the like of the driver, based on the information from the steering angle sensor 61, the acceleration sensor 62, the direction indicator detection sensor 63 and the brake sensor 64. Also, the drawing determination unit 83 may be configured to predict whether the vehicle speed will reach the lower limit VpL, the upper limit vpU, or the buffer value VpB of the low speed area from now, based on the sensor information, and to reflect the prediction in the control. Also, when it is detected by the steering angle sensor 61 or the direction indicator detection sensor 63 that the vehicle is changing a traveling course, the drawing determination unit 83 may draw a display on a road of a traffic lane after the change of the traveling course, too.

Also, the drawing determination unit 83 may be configured to additionally display attribute information indicating that the driver is an old person in the example of the embodiment 1 (FIG. 5), information such as the vehicle speed of the vehicle in the examples of the embodiments 2 and 3 (FIGS. 6 and 7), information such as a distance to the obstacle in the examples of the embodiments 4 and 7 (FIGS. 8 and 11) and additional detailed information such as attributes of the pedestrian in the example of the embodiment 6 (FIG. 10), for example. Alternatively, in the examples of the embodiments 2 and 3 (FIGS. 6 and 7), when it is detected by the driver monitoring sensor 73 that the driver has recognized the other vehicle by the displays I6 and I7, it is also effective to stop the displays I6 and I7 or to make a display indicating that the driver has recognized the other vehicle.

In the meantime, the vehicular display system 7 is not limited to the configuration where it is accommodated in the lamp device 1. For example, the vehicular display system 7 may be arranged outside the lamp device 1, such as a configuration where the vehicular display system 7 is fixed with facing forwards on a roof of the vehicle. Also, when it is desired to make a display at the rear of the vehicle, the vehicular display system 7 may be arranged at a turn signal lamp, a stop lamp or the like. Also, when the vehicular display systems 7 are respectively accommodated in the left and right lamp devices 1, the vehicular display systems 7 may make different displays in the left and right lamp devices. Alternatively, the vehicular display system 7 may adopt a swinging mechanism punched into a predetermined mark shape, instead of the scanning mechanism 11, and make a display by a mechanical configuration.

The invention claimed is:

1. A vehicular display system comprising:
   a vehicle speed sensor detecting a vehicle speed of a vehicle;
   an information sensor detecting information to which a driver and/or other person should pay attention; and
   a drawing unit drawing a predetermined display around the vehicle in conjunction with a detection of the information sensor, wherein
   the drawing unit operates when the vehicle speed is within a predetermined low speed area, starts an operation thereof when the vehicle speed becomes above a lower limit of the low speed area, and stops the operation thereof when the vehicle speed exceeds an upper limit of the low speed area.

2. The vehicular display system according to claim 1, wherein
   after the drawing unit stops the operation thereof as the vehicle speed exceeds the upper limit, the drawing unit again operates when the vehicle speed becomes a predetermined buffer value or less within the low speed area.

3. The vehicular display system according to claim 2, wherein
   the buffer value is 85% or higher of the upper limit.

4. The vehicular display system according to claim 1, wherein
   the upper limit is set to a vehicle speed of 35 km/h or higher.

5. The vehicular display system according to claim 1, wherein
   the lower limit is equal to or less than a vehicle speed of 20 km/h.

6. The vehicular display system according to claim 1, wherein
   the drawing unit increases an output of a light source forming the display in proportion to an increase in the vehicle speed.

* * * * *